(12) United States Patent
Smee et al.

(10) Patent No.: US 6,400,761 B1
(45) Date of Patent: Jun. 4, 2002

(54) METHOD AND APPARATUS FOR ADAPTIVELY COMPENSATING CHANNEL OR SYSTEM VARIATIONS IN PRECODED COMMUNICATIONS SYSTEM

(75) Inventors: John E. Smee, San Diego, CA (US); Stuart C. Schwartz, Princeton, NJ (US)

(73) Assignee: Princeton University, Princeton, NJ (US)

(*) Notice: Subject to any disclaimer, the term of this patent is extended or adjusted under 35 U.S.C. 154(b) by 0 days.

(21) Appl. No.: 09/591,828

(22) Filed: Jun. 12, 2000

Related U.S. Application Data
(60) Provisional application No. 60/154,077, filed on Sep. 15, 1999.

(51) Int. Cl.[7] .......................... H03H 7/30; H03H 7/40; H03K 5/159
(52) U.S. Cl. ...................................... 375/232; 375/259
(58) Field of Search ................................ 375/232, 233, 375/219, 229, 285, 296, 346, 348, 350, 221, 347; 708/323

(56) References Cited

U.S. PATENT DOCUMENTS

| | | |
|---|---|---|
| 4,866,736 A | 9/1989 | Bergmans |
| 4,870,657 A | 9/1989 | Bergmans et al. |
| 5,003,555 A | 3/1991 | Bergmans |
| 5,249,200 A | 9/1993 | Chen et al. |
| 5,311,547 A | 5/1994 | Wei |
| 5,396,519 A | 3/1995 | Betts et al. |
| 5,461,640 A | 10/1995 | Gatherer |
| 5,488,633 A | 1/1996 | Laroia |
| 5,513,216 A | 4/1996 | Gadot et al. |
| 5,550,810 A | 8/1996 | Monogioudis et al. |
| 5,604,769 A | 2/1997 | Wang |
| 5,809,033 A | 9/1998 | Turner et al. |
| 5,809,086 A * | 9/1998 | Ariyavisitakul ............... 375/232 |
| 5,841,484 A | 11/1998 | Hulyalkar et al. |
| 5,852,630 A * | 12/1998 | Langberg et al. ........... 375/219 |
| 5,987,061 A | 11/1999 | Chen |

OTHER PUBLICATIONS

John G. Proakis, "Digital Communications," McGraw–Hill, 4th edition, section 10.3.3 Predictive Decision–Feedback Equalizer, pp. 642–645.

* cited by examiner

*Primary Examiner*—Jean Corrielus
(74) *Attorney, Agent, or Firm*—Mathews, Collins, Shepherd & McKay, P.A.

(57) ABSTRACT

The present invention relates to a method and apparatus for adaptively compensating for channel or system variations in which adaptive compensation is used in the receiver of a digital communication system. The transmitter of the digital communication system includes precoding. The adaptive receiver compensation mitigates the interferences not removed by the transmitter precoder. In an embodiment of the invention, the adaptive compensation can be performed using an adaptive feedforward filter (FFF) and a feedback filter (FBF) in the receiver. The FBF output is generated based on previous values of estimates of the transmitted precoded sequence. The determined value of the FBF coefficients can be periodically relayed to the transmitter to update the precoder coefficients of the transmitter. Alternatively, the value of the FBF coefficients can be relayed to the transmitter after the value of the coefficients exceeds a predetermined threshold. Accordingly, the receiver adaptively and automatically compensates for misadjustments of the fixed transmitter precoder with respect to the actual channel at a given point in time.

30 Claims, 7 Drawing Sheets

METHOD AND APPARATUS FOR ADAPTIVELY COMPENSATING CHANNEL OR SYSTEM VARIATIONS IN PRECODED COMMUNICATIONS SYSTEM

This application claims the benefit of United States Provisional Application No. 60/154,077 filed by the applicants on Sep. 15, 1999.

BACKGROUND OF THE INVENTION

1. Field of the Invention

The present invention relates to a method and system for adaptively compensating channel or system variations in order to improve performance of precoded communications systems.

2. Related Art

Conventional systems transmit data signals at a given rate from a data transmitter to a data receiver through a channel of a transmission facility. Typically, the transmission facility has a plurality of channels. Higher data transmission rates that enable enhanced telecommunications services unfortunately give rise to intersymbol interference (ISI) when the channel frequency response is non-flat over the bandwidth of the transmitted signal. ISI results from various dispersion effects and/or multipate in the channel used for transmission which broaden pulses transmitted over the channel and causes them to interfere with one another. Unless compensatory measures are taken, the effects of ISI severely limit achievable bit error rates.

Linear equalization (LE) and decision feedback equalization (DFE) are two conventional techniques for mitigating ISI. DFE has been shown to outperform LE since DFE makes use of a feedforward filter (FFF) and a feedback filter (FBF) in the receiver, while LE only uses a FFF, see, J. E. Smee and N. C. Beaulieu, "Error-rate Evaluation of Linear Equalization and Decision Feedback Equalization with Error Propagation," IEEE Trans. on Commun., vol. 46, no. 5, pp. 656–665, May 1998. The typical DFE includes a feedforward filter between the channel and a first input to an adder, and a feedback filter between the output of a slicer and a second input to the adder. The output of the adder is the input to the slicer.

Figure 1:
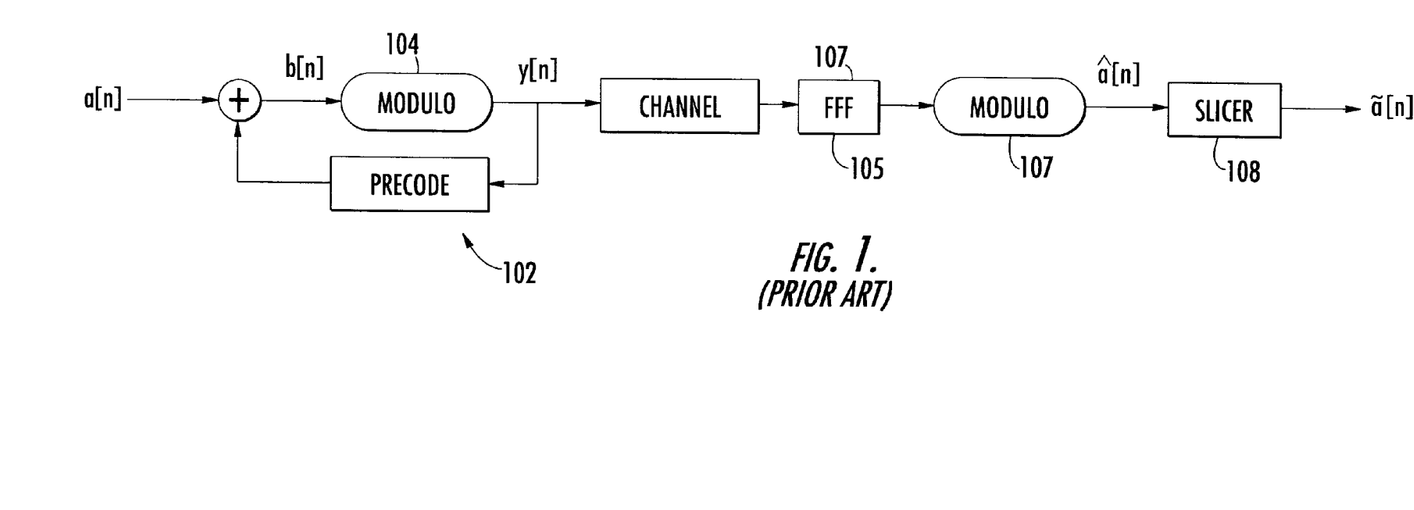
FIG. 1 is a schematic diagram of a prior art Tomlinson-Harashima precoding system.

The performance of DFE can deteriorate due to the effects of error propagation, in which detection error advances through the FBF. To achieve the performance of a DFE without error propagation, a method using a precoder was proposed in which a FBF is implemented at the transmitter, instead of the receiver, as described in M. Tomlinson, "New Automatic Equalizer Employing Modulo Arithmetic," Electron Lett., vol. 7, pp. 214–218, March 1971 and H. Harishima and H. Miyakawa, "Matched-Transmission Technique for Channels with Intersymbol Interference", IEEE Transactions On Communications, Vol. Com-20, No. 4, pp. 774–780, August 1972. This method precompensates for postcursor ISI without increasing transmitted power. Modulo arithmetic is used to bound the transmitted power. FIG. 1 illustrates a conventional Tomlinson Harashima precoding system. Precoder 102 provides precoder coefficients as input to module 104 which reduces b[n] to y[n]. Feedforward filter 105 receives output from communication channel 106. Module determiner 107 reduces output of feedforward filter 105 which is applied to slicer 108. Conventional methods typically use a combination of a feedback filter (FBF) with the feedforward filter (FFF) in the receiver during training of the precoder. When the training is complete, the FBF coefficients are transmitted to the precoder where an equivalent FBF is implemented. Thereafter, the FBF in the receiver is disconnected. In order to compensate for changing channel conditions the FFF in the receiver is adaptively adjusted by a decision-directed algorithm with linear compensation.

Precoding has found widespread use in voice-band modems where precoding can be effectively combined with trellis-coded modulation to enable bit rates of 33.6 kb/s to 56 kb/s in a bandwidth of less than 4 KHz, as described in G. D. Forney Jr. and M. V. Eyuboglu, "Combined Equalization and Coding Using Precoding," IEEE Commun. Mag., pp. 25–34, December 1991 and M. V. Eyuboglu and G. D. Forney, "Trellis Precoding: Combined Coding, Precoding and Shaping for Intersymbol Interference Channels," IEEE Trans. Inform. Theory, vol. 38, no. 2, pp. 301–314, March 1992.

A conventional voice band modem can connect computer users end-to-end through the Public Switched Telephone Network (PSTN). However, the twisted pair telephone subscriber loop of a computer user has a much wider usable bandwidth. The term digital subscriber line (DSL) has been used to refer to technologies which offer significantly higher bit rates, from 1.5 Mb/s to 52 Mb/s, over the local loop twisted-wire-pairs which connect the service provider's Central Office to a customer's premises, as described in J. M. Cioffi, V. Oksman, J. J. Werner, T. Pollet, M. P. Spruyt, J. S. Chow, and K. S. Jacobsen, "Very-high-speed Digital Subscriber Lines," IEEE Commun. Mag., pp. 334–343, March 1997. With advancing technology and an increasing desire for higher downstream bit rates, standardization efforts have resulted in a series of DSL embodiments collectively referred to as xDSL with the acronyms high-speed (H), asymmetric (A), and very high-speed (V); for example, HDSL, HDSL2, ADSL, and VDSL.

U.S. Pat. No. 5,987,061 describes a modem that operates in the voice-band frequency and the xDSL frequency bands. The modem uses a Digital Signal Processor (DSP), so that different existing ADSL line codes, such as Discrete MultiTone (DMT) and Carrierless AM/PM (CAP), can be implemented on the same hardware platform. The modem negotiates, in real-time, for a desired line transmission rate to accommodate line condition and service-cost requirement. The line code and rate negotiation process can be implemented at the beginning of each communication session through the exchange of tones between the modems. A four-step mid-band digital subscriber line (MDSL) modem initialization process is provided for line code and rate compatibility. The system includes a direct equalizer system with an adaptive filter in the transmitter for symmetrical dispersive transmission channels. The filter coefficients are identified in the receiving path using shift and addition operations. A training sequence is multipled with data at the transmission path. In the receiver path, a received data detection function controls adaptation of transmitter filter coefficients. The combination of the transmit filter and its adaptation mechanism forms the direct channel equalization. The filter coefficients are updated periodically using a (DSP) in a few baud intervals.

Provided that the fading is slow enough, preceding of the FBF can also be applied to wireless channels with ISI. In wireless and other environments, it is often desirable to use multiple receiver antennas and multiple feedforward filters. It has been suggested to implement both the FFF and FBF operations of the DFE at the transmitter to transfer complexity from the wireless user to the basestation, as described in A. B. Sesay and M. R. Gibbard, "Asymmetric Signal Processing for Indoor Wireless LANs," in Proc. of the IEEE 6$^{th}$ Int. Symp. on Personal, Indoor, and Mobile Radio Commun., PIMRC 95, Toronto, Canada, Sep. 27–29, 1995, pp. 6–10. This approach has the limitation that problems arise in maintaining a peak power constraint.

An adaptive LE in the receiver has been used to deal with precursor ISI, as described in P. R. Chevillat and E. Eleftheriou, "Decoding of Trellis-encoded Signals in the Presence of Intersymbol Interference and Noise," IEEE Trans. on Commun., vol. 37, no. 7, pp. 669–676, July 1989. In this implementation a whitened matched filter (WMF) precedes an augmented maximum likelihood sequence detection (MLSD) which is assigned the task of trellis decoding in the presence of postcursor ISI. The motivation for making the WMF adaptive stems from the desire to compensate for slowly varying channels. Adaptive linear techniques have more recently been applied to the DSL, as described in S. McCaslin and N. van Bavel, "HDSL2 Performance with Run-Time Precoder Coefficient Updates," Proposal to Standards Committee of T1-Telecommunications, Subcommittee T1E1.4, study group in Huntsville, Ala., Jun. 1–4, 1998 and E. Shusterman, "Performance Implications of a Non-additive Tomlinson-Harashima Precoder," Proposal to Standards Committee of T1-Telecommunications Subcommittee T1E1.4, study group in Austin, Tex., Mar. 2–5, 1998.

U.S. Pat. No. 5,513,216 describes the use of a hybrid DFE in which a precoder and modulo device is used at the transmitter while an FFF, a modulo device, a noise-predictive (NP) FBF, and an ISI canceling FBF are used at the receiver. The '216 patent has the shortcomings that the slicer output serves as the input to both the ISI canceling FBF and the NP FBF, thus leading to a less reliable estimate of the transmitted symbol which is applied to the receiver modulo operation.

It is desirable to provide an improved method for adaptively compensating for channel or system variations.

SUMMARY OF THE INVENTION

The present invention relates to a method and apparatus for adaptively compensating for channel or system variations in which adaptive compensation is used in the receiver of a digital communication system. The transmitter of the digital communication system includes precoding. The adaptive receiver compensation mitigates the interferences not removed by the transmitter precoder.

In an embodiment of the invention, the adaptive compensation can be performed using an adaptive feedforward filter (FFF) and a feedback filter (FBF) in the receiver. The FBF output is generated based on previous values of estimates of the transmitted precoded sequence. The determined value of the FBF coefficients can be periodically relayed to the transmitter to update the precoder coefficients of the transmitter. Alternatively, the value of the FBF coefficients can be relayed to the transmitter after the value of the coefficients exceeds a predetermined threshold. Accordingly, the receiver adaptively and automatically compensates for misadjustments of the fixed transmitter precoder with respect to the actual channel at a given point in time.

In the present invention, the output of the receiver's FFF is added to the output of the receiver's FBF, and the sum is applied to the input of the receiver modulo device. The input to the postcursor ISI canceling FBF is not the slicer output itself, but is instead a version of the slicer output which is modified to account for the receiver modulo device. The receiver does not include the use of a noise-predictive FBF. The approach offers improved performance since a more reliable (with both precursor ISI and postcursor ISI accounted for) estimate of the transmitted symbol is applied to the receiver modulo operation, thus making it more likely that the receiver modulo correctly cancels the action of the transmitter modulo operation for that symbol.

The apparatus and method can also be used in conventional narrowband and wideband spread spectrum communication systems including digital subscriber line (DSL) modems having high data rates such as HDSL and VDSL and direct-sequence spread spectrum systems, such as DS-CDMA.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2A:
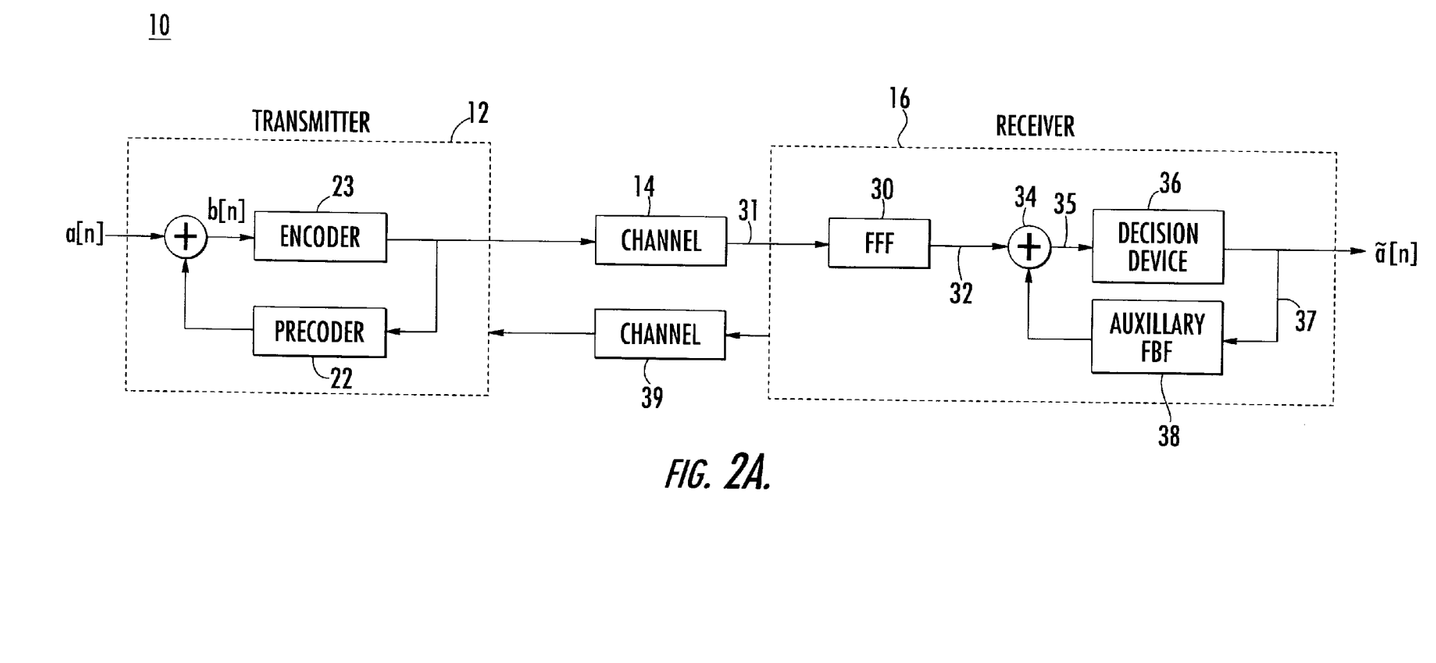
FIG. 2A is a schematic diagram of an apparatus for adaptively compensating channel or system variations in a precoded communications system in accordance with the teachings of the present invention.

FIG. 2A illustrates an apparatus for adaptively compensating channel or system variations in a precoded communication system 10 in accordance with the teachings of the present invention. Data signals are transmitted from transmitter 12 via communications channel 14 to receiver 16. For example, channel 14 can be implemented as a wire pair of a telephone line having a plurality of wire pairs, a coaxial cable, an optical fiber or wireless link. In the case of a wireless link, multiple receive antennas can be included. The transmission scheme can be any conventional transmission scheme including those described in U.S. Pat. No. 5,987,061 hereby incorporated by reference into this application. The transmission system can also be code division multiple access (CDMA) for direct sequence CDMA systems (DS-CDMA) over coaxial or wireless connections or other arrangements. The data signals can be transmitted by communication systems at a variety of rates, such as 33 Kbps for voice band modems or 52 Mbps for very high speed digital subscriber line modems based on Carrierless Amplitude/Phase (CAP)/Quadrature Amplitude Modulation (QAM). It will be appreciated than any conventional bit rate or modulation scheme can be used in accordance with the teachings of the present invention.

Input a(n) represents a data symbol at time n of a constellation A of data symbols. For example, for M-point pulse amplitude modulation (PAM), constellation A comprises M equally spaced levels, i.e., A={±1,±3 ..., ±(M-1)}, the set of odd integers in the interval [−M, M]. Precoder combiner 20, typically an adder, adds output from precoder 22 to a(n) to form b(n). Encoder 23 encodes b(n) to provide y(n).

Figure 2B:
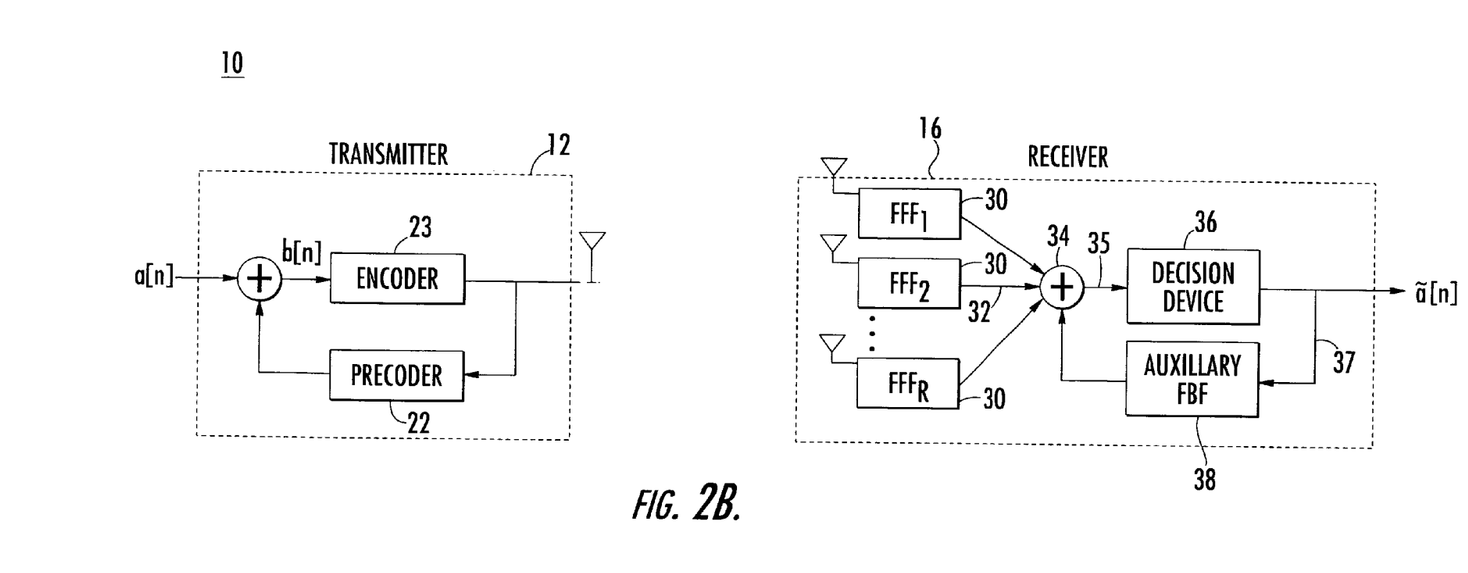
FIG. 2B is a schematic diagram of an apparatus for adaptively compensating channel or system variations in a precoded communications system including multiple receiver antennas and one feedforward filter per antenna over a wireless communication channel.

Adaptive feedforward filter (FFF) 30 receives output 31 from communications channel 14. In the embodiment of multiple receiver antennas, the equivalent of one feedforward filter per antenna can be implemented, as shown in FIG. 2B. Output 32 from FFF 30 is received at combiner 34. Other than the inventive concept the components of FIG. 2A are well known and will not be described in detail. For example, FFF 30 can be a fractionally spaced equalizer. The outputs of the filtering process are dependent upon the filter coefficients. FFF 30 removes a portion of the ISI or other channel or system variations, such as channel and noise present in the received data signal.

Decision device 36 monitors output 35 from combiner 34 and makes a decision on a symbol by symbol basis. Decision device 36 can be a slicer, soft limiter or any conventional symbol by symbol detector.

FBF 38 filter coefficients, weighting factors, can adjust adaptively to remove the postcursor ISI. FBF 38 filter coefficients and FFF 30 filter coefficients can be adapted with conventional decision directed methods such as least-mean square (LMS) or recursive least squares (RLS) or any other conventional scheme recursive scheme. Adaptive compensation represented by FBF 38 coefficients determined at receiver 16 are periodically relayed via control channel 39 to transmitter 12 for updating precoder coefficients as described below. FBF coefficients can also be transmitted when an error quantity exceeds a threshold value or on a non-periodic basis. For example, if there are no changes in channel 14, coefficients of FBF 38 would all be determined as zero. As channel 14 changes, the values of the coefficients of FBF 38 change and the FBF coefficients are relayed to transmitter 12. Thereafter, at precoder 22 the precoder coefficients are updated and at FBF 38 the coefficients are set to zero and the cycle is repeated.

Figure 3:
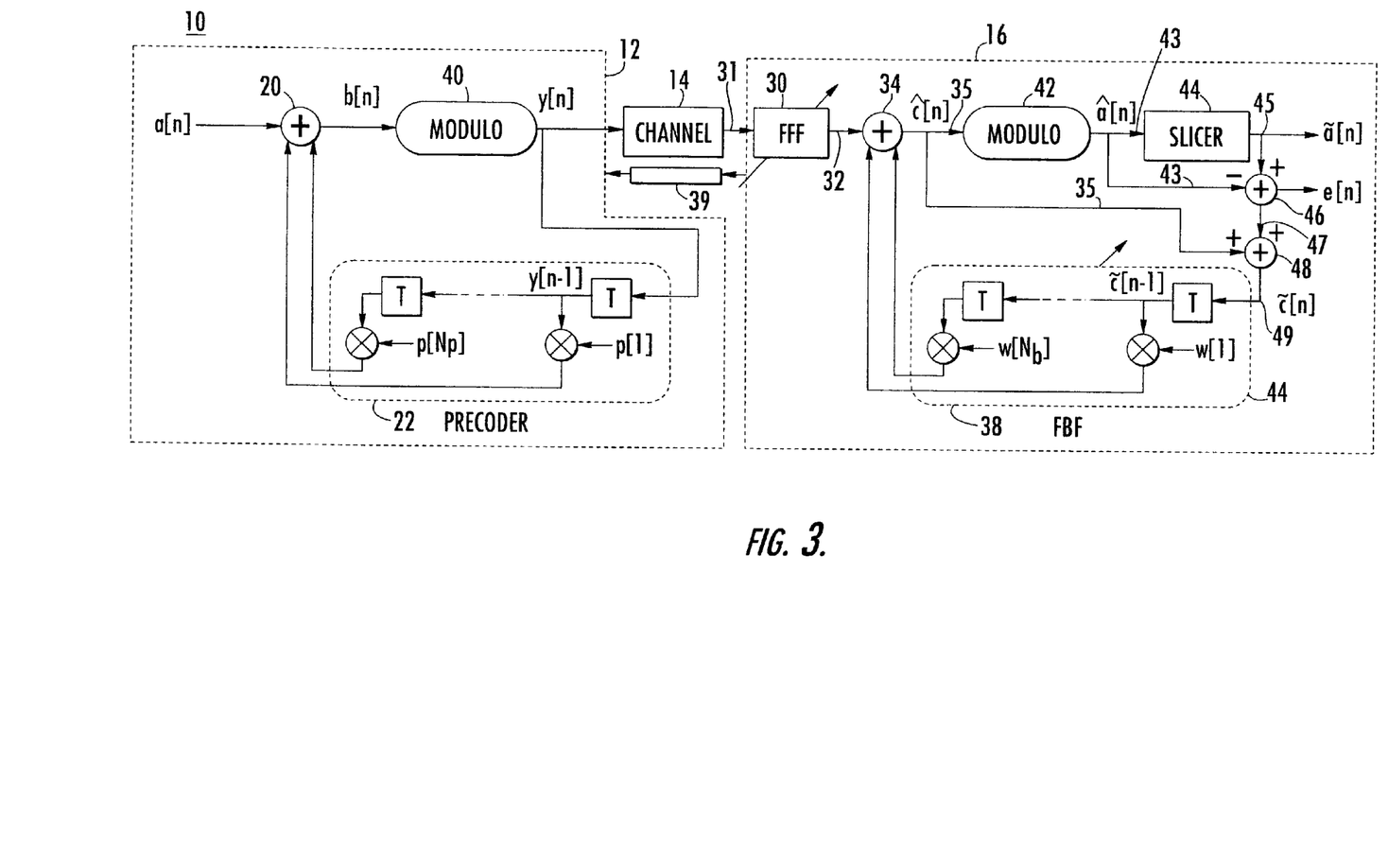
FIG. 3 is a schematic diagram of an embodiment of the apparatus of the present invention.

FIG. 3 illustrates an embodiment of apparatus 10 including a modulo device which is used in transmitter 12 as the encoder and a modulo device which is used in receiver 16 as the decision device. Modulo determiner 40 reduces b(n) to y(n) by subtracting or adding an integer multiple of 2L such that the modulo determiner output α satisfies the condition −L≦α≦L.

Figure 4:
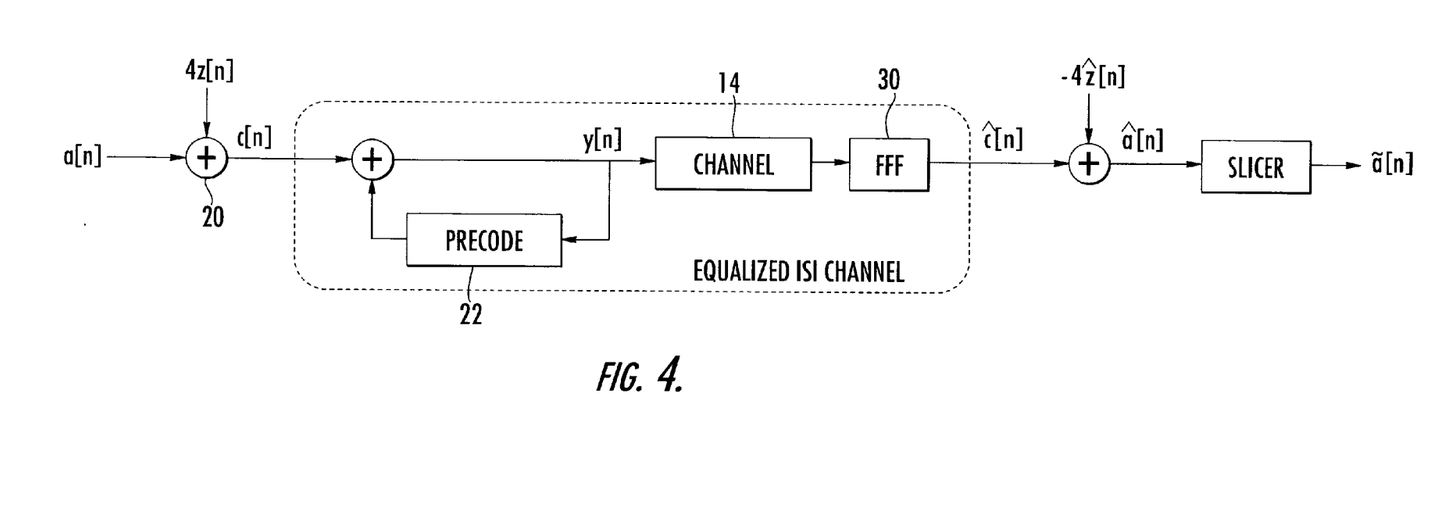
FIG. 4 is a schematic diagram of a model for a precoding system with QPSK.

As an example of two dimensional constellation transmission, FIG. 4 illustrates a model for precoding with quadrature phase shift keying QPSK with a(n) belonging to the set of {−1−j}, {−1+j}, {+1−j}, {+1+j}. The modulo determiner reduces b(n) so that the real and imaginary components of y(n) lie in the half open interval [−2,2). Equivalently, this specifies the complex number z(n) where y(n)=b(n)+4z(n). c(n) is used to represent a data signal in an enlarged constellation based on translates of the a(n). With this model, c(n)=a(n)+4z(n).

Output of precoder 22 is determined by multiplying the complex conjugate of the precoder coefficients p(1) to p($N_p$) by previous modulo outputs y(n−1) to y(n−$N_p$) where a data symbol is provided every T seconds. Precoder 22 can be represented by the z transform:

$$P(Z) = p_1 z^{-1} + p_2 z^{-2} + \ldots + p_{N_p} z^{-N_p} \quad (1)$$

Output 35 from combiner 34 is represented by ĉ(n), as a soft estimate of constellation data symbol c(n). Output 35 can be represented by the following:

$$\hat{c}(n) = u^H(n) x(n) \quad (2)$$

wherein u(n) represents a coefficient vector, x(n) represents a content vector and H represents conjugate transpose. Output 35 is reduced with modulo determiner 42 to form slicer input 43 represented by â(n). Slicer 44 operates on â(n) to form slicer output 45 represented by ã(n). Slicer 44 selects ã(n) as a mapping to a predefined constellation of data symbols (not shown). Slicer input 43 and slicer output 45 are applied to difference circuit 46 to provide error signal e(n). Error signal e(n) represents the amount of ISI error and other channel or system variations that has not been corrected by the operation of FFF 30 or FBF 38. Output 47 from difference circuit 46 and output 35 are added in adder 48 to form FBF input 49 represented by c̃(n). Accordingly, FBF input 49 is represented by:

$$\tilde{c}(n) = \hat{c}(n) + \tilde{a}(n) - \hat{a}(n) \quad (3)$$

FBF 38 has a memory span $N_b$ corresponding to the number of consecutive data symbols, so that the formed cancelling signal at any instant is a weighted combination of $N_b$ consecutive symbol decisions previously made, as represented by c̃(n−1) to c̃(n−$N_b$). FBF 38 can be represented by the z transform:

$$W(z) = w_1 z^{-1} + w_2 Z^{-2} + \ldots + w_{N_b} z^{-N_b} \quad (4)$$

wherein $w_1 \ldots w_{N_b}$ represent FBF 38 filter coefficients.

A LMS update of coefficients can be represented by:

$$u(n+1) = u(n) + \Delta_{LMS} x(n) \, (\tilde{a}(n) - \hat{a}(n))^* \quad (5)$$

RLS update of coefficients can be determined using an initial condition G(0)=δI from the following:

$$\hat{c}(n) = u^H(n-1) x(n), \, g(n) = \lambda^{-1} G(n-1) x(n) \quad (6)$$

$$q(n) = g(n)/1 + x^H(n) g(n), \, G(n) = \lambda^{-1} G(n-1) - q(n) g^H(n) \quad (7)$$

$$u(n) = u(n-1) + q(n) \, (\tilde{a}(n) - \hat{a}(n))^* \quad (8)$$

Figure 5A:
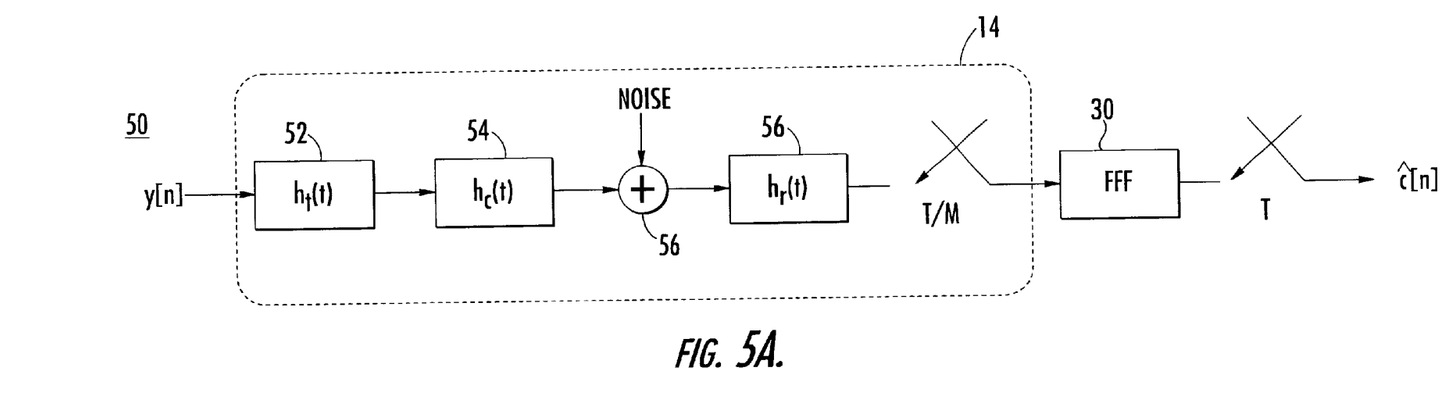
FIG. 5A is a schematic diagram of a model of a narrowband communications system.
Figure 5B:
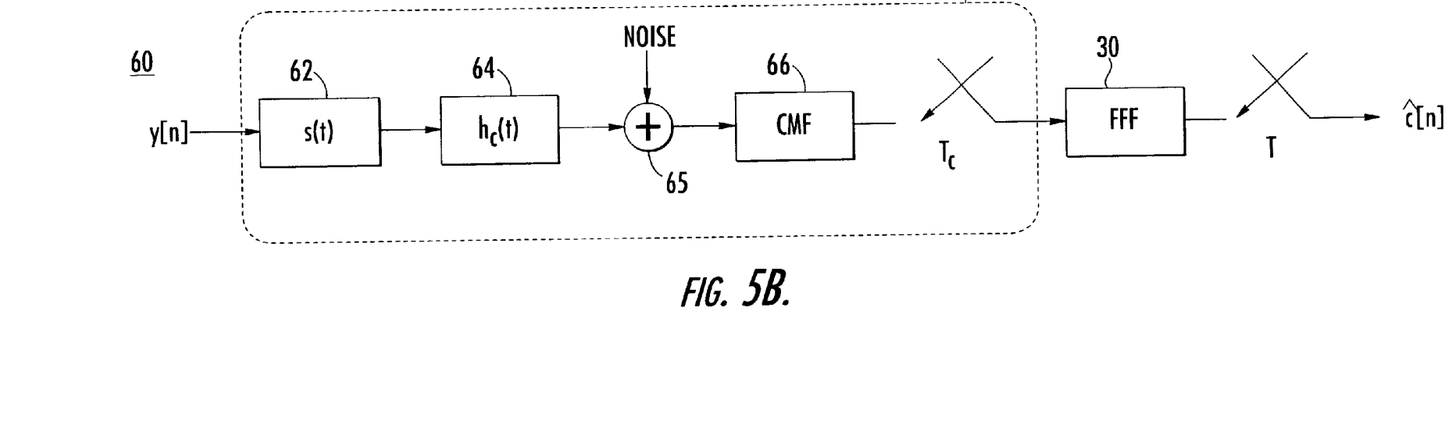
FIG. 5B is a schematic diagram of a model of a direct-sequence spread spectrum communication system.

Communications channel 14 can represent a channel used in narrow band communication system 50, shown in FIG. 5A, or direct-sequence spread spectrum communications systems 60, shown in FIG. 5B. Narrowband communication system 50 can be modeled with transmitter filter 52, $h_t(t)$ baseband equivalent channel 54, $h_c(t)$, noise adder 56, and receiver filter 56, $h_r(t)$. Narrowband communication system 50 operates at sampling M times per symbol. Direct sequence spread-spectrum can be modeled with signature waveform 62, s(t), baseband equivalent channel 64, $h_c(t)$, noise adder 65, and receiver chip-matched filter 66 (CMF). Direct-sequence spread-spectrum 60 operates at sampling once per chip.

Figure 6:
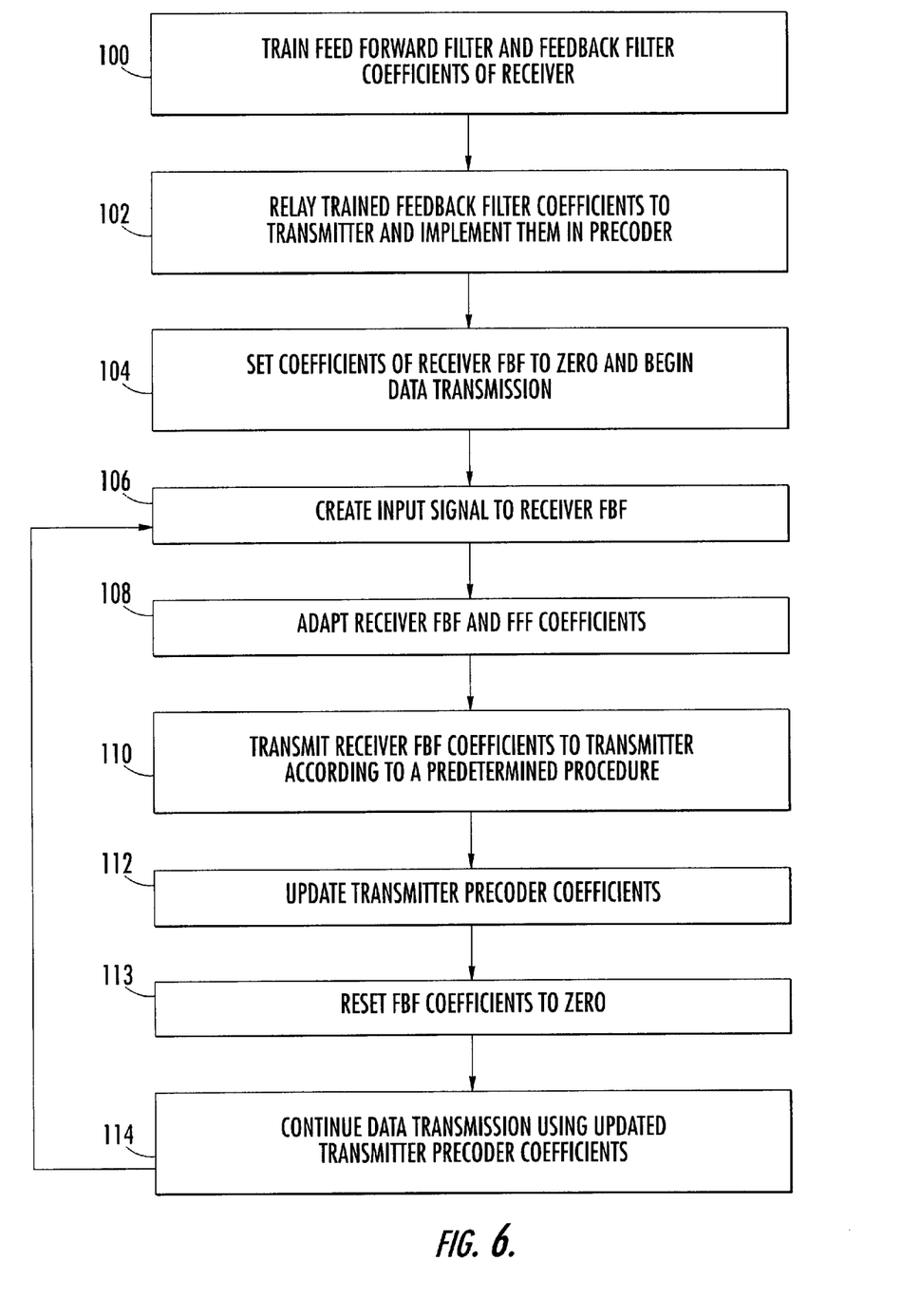
FIG. 6 is a flow diagram of a method for training and implementing the apparatus shown in FIG. 2.

FIG. 6 illustrates a flow diagram of a method for training and implementing apparatus 10 during startup. In block 100, without encoder 23 of transmitter 12 and decision device 36 of receiver 16 operating, minimum mean square error (MMSE) training coefficients of adaptive FFF 30 and receiver FBF 38 are determined with techniques known to those skilled in the art. The determined training coefficients are relayed to transmitter 12 via control channel 39. The received training coefficients are used as precoding coefficients in precoder 22. Thereafter, in block 104, training coefficients of FBF 38 are set to zero and data transmission begins from transmitter 12 to receiver 16 with operation of precoder 22, encoder 23 and decision device 36.

In block 106, FBF input 37 is determined. In block 108, coefficients at FBF 37 and adaptive FFF 30 are adapted, for example, with LMS or RLS as described above. The adapted FBF coefficients are transmitted to transmitter 12 via control channel 39, in block 110. For example, at the end of each frame of data, the adapted FBF coefficients can be relayed from receiver 16 to transmitter 12. Alternatively, if during adaptation the adapted FBF coefficients exceed a predetermined threshold, the adapted FBF coefficients can be relayed from receiver 16 to transmitter 12 via control channel 39.

In block 112, previous coefficients of transmitter precoder 22 represented by $P_{old}(z)$ are updated to new precoder coefficients represented by $P_{new}(z)$ according to the following:

$$P_{new}(z)=P_{old}(z)+W(z)-P_{old}(z)W(z) \quad (9)$$

Generally, as known in the art, an adaptive filter is a delay line that includes a number of taps. If the desired number of precoder coefficients is represented by K, then all coefficients except the first K taps Of $P_{new}(z)$ are set to zero. In block 113, the FBF coefficients are reset to zero. Data transmission continues using updated transmitter precoding coefficients in block 114. Thereafter, block 114 returns to block 106 to adapt receiver FBF and FFF coefficients.

For example, although the invention is illustrated herein as being implemented with discrete functional building blocks, e.g., slicers, filters, etc., the functions of any one or more of those building blocks can be carried out using one or more appropriate programmed processors, e.g., a digital signal processor. Further, although Tomlinson-Harishima precoding was illustrated, any precoding scheme can be used in conjunction with the inventive concept. This proposed scheme can be used in either an uncoded or coded communication system, or a system with single or multiple antennas and feedforward filters.

It is also important to note that the invention is not limited to modem technology but rather to any type of signal transmission system and/or environment in which inter-symbol interference, other forms of interference or deterministic effects are present.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. An apparatus for communicating data from a transmitter over a communications channel to a receiver, comprising:
   means for generating a precoded sequence of data symbols at a precoder at said transmitter, said precoded sequence being generated based on performing a modulo operation on a sum of input data symbol values and previous values of said precoded sequence, said precoded sequence being transmitted to said receiver via said communications channel as a transmitted precoded sequence; and
   means for determining adaptive compensation of a received signal of said transmitted precoded sequence by using a feedback filter in said receiver, wherein a first estimate of said received precoded sequence before a modulo operation is used to form a second estimate of said received precoded sequence based on said modulo operation and a slicer operation with previous values of said second estimate being input to said feedback filter.

2. The apparatus of claim 1 wherein said means for determining adaptive compensation comprises:
   an adaptive feedforward filter at said receiver, with output of said feedforward filter being added to output of said feedback filter to form said first estimate;
   a modulo operator performing said modulo operation on said first estimate to provide modulo output; and
   a slicer operating on said modulo output to form slicer output, said second estimate is formed by adding said first estimate to said slicer output minus said modulo output.

3. The apparatus of claim 2 further comprising:
   means for updating precoder coefficients of said precoder by periodically forwarding to said transmitter feedback filter coefficients of said feedback filter and generating new precoder coefficients based on previous values of said precoder coefficients and said feedback filter coefficients.

4. The apparatus of claim 3 wherein a response function of said precoder is represented by the z transform $$P(z)=p_1z^{-1}+p_2z^{-2}+\ldots+p_{Np}z^{-Np}$$

wherein $p_1 \ldots p_{Np}$ represent said precoder filter coefficients from 1 to an integer represented by $N_p$;
   a response function of said feedback filter is $$W(z)=w_1z^{-1}+w_2z^{-2}+\ldots+w_{Nb}z^{-Nb}$$

wherein $w_1 \ldots w_{Nb}$ represent said feedback filter coefficients; and
   said means for updating said precoder coefficients is equal to $$P_{new}(z)=P_{old}(z)+W(z)-P_{old}(z)W(z)$$

wherein $P_{old}(z)$ represents the response function before application of said means for updating and $P_{new}(z)$ represents the response function determined by said means for updating.

5. The apparatus of claim 2 further comprising:
   means for updating said precoder coefficients of said precoder by forwarding to said transmitter feedback filter coefficients of said feedback filter after said determined adaptive compensation exceeds a predetermined threshold and generating new precoder coefficients based on previous values of said precoder coefficients and said feedback filter coefficients.

6. The apparatus of claim 5 wherein a response function of said precoder is represented by the z transform $$P(z)=p_1z^{-1}+p_2z^{-2}+\ldots+p_{Np}z^{-Np}$$

wherein $p_1 \ldots p_{Np}$ represent said precoder filter coefficients from 1 to an integer represented by $N_p$;
   a response function of said feedback filter is $$W(z)=w_1z^{-1}+w_2z^{-2}+\ldots+w_{Nb}z^{-Nb}$$

wherein $w_1 \ldots w_{Nb}$ represent said feedback filter coefficients; and said means for updating said precoder coefficients is equal to $$P_{new}(z)=P_{old}(z)+W(z)-P_{old}(z)W(z)$$

wherein $P_{old}(z)$ represents the response function before application of said means for updating and $P_{new}(z)$ represents the response function determined by said means for updating.

7. The apparatus of claim 2 wherein said second estimate is formed by passing said first estimate to a multilevel slicer device having thresholds set according to translates of an original symbol constellation of said data.

8. An apparatus for communicating data from a transmitter over a communications channel to a receiver comprising:
   means for generating a precoded sequence of data symbols at a precoder at said transmitter, said precoded sequence being generated based on input data symbol values and previous values of said precoded sequence, said precoded sequence being transmitted to said receiver via said communications channel as a transmitted precoded sequence;
   means for determining adaptive compensation of a received signal of said transmitted precoded sequence by using a feedback filter in said receiver, feedback filter output of said feedback filter being generated based on previous values of modified estimates of said transmitted precoded sequence, said means for determining adaptive compensation comprises an adaptive feedforward filter at said receivers, with modified previous values of a sum of output of said feedforward filter and said feedback filter output being used as input to said feedback filter; and
   means for updating precoder coefficients of said precoder by periodically forwarding to said transmitter feedback filter coefficients of said feedback filter and generating new precoder coefficients based on previous values of said precoder coefficients and said feedback filter coefficients.

9. The apparatus of claim 8 wherein a response function of said precoder is represented by the z transform $$P(z)=p_1z^{-1}+p_2z^{-2}+\ldots+p_{Np}z^{-Np}$$

wherein $p_1 \ldots P_{Np}$ represent said precoder filter coefficients from 1 to an integer represented by $N_p$;
   a response function of said feedback filter is $$W(z)=w_1z^{-1}+w_2z^{-2}+\ldots+w_{Nb}z^{-Nb}$$

wherein $w_1 \ldots w_{Nb}$ represent said feedback filter coefficients; and
   said means for updating said precoder coefficients is equal to $$P_{new}(z)=P_{old}(z)+W(z)-P_{old}(z)W(z)$$

wherein $P_{old}(z)$ represents the response function before application of said means for updating and $P_{new}(z)$ represents the response function determined by said means for updating.

10. The apparatus of claim 8 wherein said adaptive feed forward filter and said feedback filter are adapted in tandem using a least-mean square algorithm.

11. The apparatus of claim 8 wherein said adaptive feed forward filter and said feedback filter are adapted using a recursive least square algorithm.

12. The apparatus of claim 8 wherein said precoder is a Tomlinson-Harashima precoder.

13. The apparatus of claim 8 wherein said data symbols comprise digital subscriber line (DSL) signals.

14. The apparatus of claim 8 wherein said data symbols comprise very high speed digital subscriber line (VDSL) signals.

15. The apparatus of claim 8 wherein said data symbols comprise direct sequence spread-spectrum signals.

16. The apparatus of claim 8 wherein said feed forward filter comprises a plurality of feed forward filters which operate in parallel on respective output of a plurality of receiver antennas at said receiver.

17. A method for communicating data from a transmitter over a communications channel to a receiver comprising generating a precoded sequence of data symbols at a precoder at said transmitter;
   transmitting said precoded sequence of data symbols to said receiver as a transmitted precoded sequence; and
   determining adaptive compensation for a received signal of said transmitted precoded sequence by using a feedback filter in said receiver, said feedback filter output being generated based on previous values of modified estimates of said transmitted precoded sequence, wherein a response function of said precoder is represented by the z transform $$P(z)=p_1z^{-1}+p_2z^{-2}+\ldots+p_{Np}z^{-Np}$$

where $p_1 \ldots P_{np}$ represent said precoder filter coefficients from 1 to an integer represented by $N_p$;
   a response function of said feedback filter is $$W(z)=w_1z^{-1}+w_2z^{-2}+\ldots+w_{Nb}z^{-Nb}$$

where $w_1 \ldots w_{nb}$ represent said feedback filter coefficients; and
   said means for updating said output of said precoder is equal to $$P_{new}(z)=P_{old}(z)+W(z)-P_{old}(z)W(z)$$

wherein $P_{old}(z)$ represents the response function before application of said means for updating and $p_{new}(z)$ represents the response function determined by said means for updating.

18. An apparatus for communicating data from a transmitter over a communications channel to a receiver comprising:
   means for generating a precoded sequence of data symbols at a precoder at said transmitter, said precoded sequence being generated based on input data symbol values and previous values of said precoded sequence, said precoded sequence being transmitted to said receiver via said communications channel as a transmitted precoded sequence;
   means for determining adaptive compensation of a received signal of said transmitted precoded sequence by using a feedback filter in said receiver, feedback filter output of said feedback filter being generated based on previous values of modified estimates of said transmitted precoded sequence, said means for determining adaptive compensation comprises an adaptive feedforward filter at said receiver, with modified previous values of a sum of output of said feedforward filter and said feedback filter output being used as input to said feedback filter; and
   means for updating said precoder coefficients of said precoder by forwarding to said transmitter feedback filter coefficients of said feedback filter after said determined adaptive compensation exceeds a predetermined threshold and generating new precoder coefficients based on previous values of said precoder coefficients and said feedback filter coefficients.

19. The apparatus of claim 18 wherein a response function of said precoder is represented by the z transform $$P(z)=p_1 z^{-1}+p_2 z^{-2}+\ldots+p_{Np} z^{-Np}$$

wherein $p_1 \ldots p_{Np}$ represent said precoder filter coefficients from 1 to an integer represented by $N_p$;

a response function of said feedback filter is $$W(z)=w_1 z^{-1}+w_2 z^{-2}+\ldots+w_{Nb} z^{-Nb}$$

wherein $w_1 \ldots w_{Nb}$ represent said feedback filter coefficients; and said means for updating said precoder coefficients is equal to $$P_{new}(z)=P_{old}(z)+W(z)-P_{old}(z)W(z)$$

wherein $P_{old}(z)$ represents the response function before application of said means for updating and $P_{new}(z)$ represents the response function determined by said means for updating.

20. A method for communicating data from a transmitter over a communications channel to a receiver comprising generating a precoded sequence of data symbols at a precoder at said transmitter;

transmitting said precoded sequence of data symbols to said receiver as a transmitted precoded sequence; and determining adaptive compensation for a received signal of said transmitted precoded sequence by using a feedback filter in said receiver, wherein a first estimate of said received precoded sequence before a modulo operation is used to form a second estimate of said received precoded sequence based on said modulo operation and a slicer operation with previous values of said second estimate being input to said feedback filter.

21. The method of claim 20 further comprising the steps of:

updating precoder coefficients of said precoder by forwarding feedback filter coefficients of said feedback filter to said transmitter; and generating new precoded coefficients based on previous values of said precoder coefficients and said feedback filter coefficients.

22. The method of claim 21 wherein said feedback filter coefficients are forwarded after said determined adaptive compensation exceeds a predetermined threshold.

23. A method for communicating data from a transmitter over a communications channel to a receiver comprising generating a precoded sequence of data symbols at a precoder at said transmitter;

transmitting said precoded sequence of data symbols to said receiver as a transmitted precoded sequence;

determining adaptive compensation for a received signal of said transmitted precoded sequence by using a feedback filter in said receiver, feedback filter output being generated based on previous values of modified estimates of said transmitted precoded sequence and an adaptive feedforward filter at said receiver, with modified previous values of a sum of output of said feedforward filter and said feedback filter output being used as input to said feedback filter;

updating precoder coefficients of said precoder by forwarding feedback filter coefficients of said feedback filter to said transmitter; and generating new precoded coefficients based on previous values of said precoder coefficients and said feedback filter coefficients.

24. The method of claim 23 further comprising the step of:

adapting coefficients of said feedback filter and said feed forward filter in tandem using a least means sequence algorithm.

25. The method of claim 23 further comprising the step of:

adapting coefficients of said feedback filter and said feed forward filter in tandem using a recursive least sequence algorithm.

26. The method of claim 23 wherein said feedback filter coefficients are forwarded to said precoder after predetermined length of said digital communication signals.

27. The method of claim 23 wherein said feedback filter coefficients are forwarded after said determined adaptive compensation exceeds a predetermined threshold.

28. The method of claim 23 further comprising the steps of:

determining training coefficients of said receiver;

relaying said training coefficients to said precoder to determine said precoded sequence;

setting said adaptive compensation to zero; and beginning data transmission from said transmitter to said receiver.

29. The method of claim 28 further comprising the steps of: resetting said adaptive compensation to zero after said updating step; and restarting data transmission using said new precoded coefficients.

30. The method of claim 23 wherein said feedback filter coefficients are forwarded to said precoder after a predetermined value of said feedback filter coefficients.

* * * * *